United States Patent Office 3,427,312
Patented Feb. 11, 1969

3,427,312
SEPARATION OF AZAPHENOTHIAZINES FROM MIXTURES THEREOF WITH PHENYL PYRIDYL AMINES
Wilhelm Alfons Schuler, Bad Homburg vor der Hohe, Germany, assignor to Deutsche Gold- und Silber-Scheideanstalt vormals Roessler, Frankfurt am Main, Germany
No Drawing. Filed Mar. 18, 1966, Ser. No. 535,313
Claims priority, application Germany, Apr. 3, 1965,
D 46,958
U.S. Cl. 260—243                                   5 Claims
Int. Cl. C07d 93/16; B01d 11/04

ABSTRACT OF THE DISCLOSURE

Method for recovering azaphenothiazine contained in a mixture of an azaphenothiazine and a secondary phenyl pyridyl amine obtained in the production of said azaphenothiazine from said phenyl pyridyl amine which comprises dissolving said mixture in an inert substantially water immiscible solvent, adding a quantity of acid to said solution which is about equivalent to the quantity of phenyl pyridyl amine contained therein to form the acid addition salt of the phenyl pyridyl amine, providing a sufficient quantity of water in contact with said reaction mixture to dissolve the acid addition salt of the phenyl pyridyl amine produced, separating the resulting aqueous phase from the organic phase and recovering the azaphenothiazine retained in the organic phase.

---

The present invention relates to an improved process for the separation of azaphenothiazines from mixtures thereof with phenyl pyridyl amines.

Azaphenothiazines of the formula

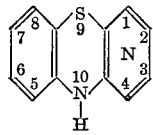

in which the benzene nucleus at the left and the pyridine nucleus at the right, which can have the N atom shown in positions 1, 2, 3 or 4, may carry one or more substituents, such as halogen, hydroxy, lower alkyl, trihalo lower alkyl and lower alkoxy can be produced fro the corresponding secondary phenyl pyridyl amines of the formula

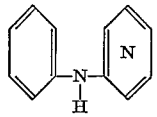

by the introduction of a sulfur bridge between the phenyl and pyridyl radicals. Such introduction of the sulfur bridge may be effected in a number of ways, such as, for example, by heating the phenyl pyridyl amines with sulfur (the so-called sulfur fusion process) or with sulfur compounds such as sulfur monochloride ($SCl_2Cl_2$), sulfur dichloride ($SCl_2$), sodium thiosulfate, antimony sulfide, arsenic sulfide, alkali metal polysulfides and similar compounds. For example, see German Patent 964,050, U.S. Patent 2,974,139 and U.S. application Ser. No. 56,702, filed Sept. 19, 1960. The reaction mixtures thus obtained aside from the desired azaphenothiazine still contain a portion of the starting phenyl pyridyl amine in admixture therewith. Such mixtures are difficult to separate by distillation. According to German patent 964,050 and U.S. application Ser. No. 56,702, separation was effected by converting the azaphenothiazines and the phenyl pyridyl amines to their acid addition salts with strong mineral acids, preferably, HCl, and crystallizing out the more insoluble acid addition salt of the azaphenothiazine from an aqueous solution of the mixture of such acid addition salts.

According to the present invention it has now been found that azaphenothiazines can be recovered from their admixtures with the corresponding phenyl pyridyl amines with good purity and with very good yields if such separation is effected upon the basis of ther difference in basicity of the substance in question which are to be separated.

According to the invention the azaphenothiazine and phenyl pyridine mixtures, if desired, after distillation, are dissolved in a substantially water insoluble inert organic solvent and then a quantity of acid about equivalent to the quantity of phenyl pyridyl amine contained in the mixture added thereto. A slight excess of acid over such equivalent quantity up to about 10% by weight can be used. The thus acidified mixture is then intensively mixed in the presence of water and then permitted to separate into an organic phase and an aqueous phase. The basic azaphenothiazine compound is retained in the organic phase whereas the acid addition salt of the phenyl pyridyl amine is taken up in the aqueous phase. The azaphenothiazine is recovered by drying the organic phase and distilling off the solvent. If desired, it can be further purified by recrystallization or distillation. The salt of the phenyl pyridyl amine which is contained in the aqueous phase can be recovered therefrom in a known manner, such as, for example, by precipitation as the free base by the addition of an alkali, such as, aqueous ammonia or alkali metal hydroxides or carbonates. The phenyl pyridyl amine recovered can be recycled and used for the production of further quantities of azaphenothiazines.

Suitable inert organic substantially water insoluble solvents, for instance, are alphatic hydrocarbons of the range of gasoline, halogenated aliphatic hydrocarbons, such as, chloroform, carbon tetrachloride, dichloroethane, dichloroethylene, trichloroethylene, aromatic hydrocarbons, such as, benzene, toluene and xylene and aliphatic ethers, such as, diethyl-, dipropyl- or dibutyl ethers. Toluene is especially suited. The organic solvents employed can be recovered by redistillation.

Strong mineral acids, such as, for example, hydrochloric acid, sulfuric acid, phosphoric acid and nitric acid can be employed for the separation according to the invention. However, organic acids, such as, for example, formic acid, acetic acid, monochloroacetic acid, dichloroacetic acid and p-toluene sulfonic acid can be employed with equally good results. Preferably such acids are employed in the form of aqueous solutions in concentrations of 0.5 to 10 N, care being taken that the system contains sufficient water to dissolve the acid addition salt of the phenyl pyridyl amine formed.

The following example will serve to illustrate the process according to the invention.

Example 54 g. of a mixture of 4-azaphenothiazine and 2-phenyl amino pyridine obtained as a distillate of the reaction mixture of a sulfur fusion process, such as described in German Patent 964,050, and containing 20 g. (0.1 mole) of 4-azaphenothiazine and 34 g. (0.2 mol) of 2-phenyl pyridyl amine were dissolved in 400 ml. of toluene. The resulting solution was then shaken intensively with 203 ml. of 1 N HCl in a separating funnel. After the aqueous and organic layers were separated, the toluene layers were separated, the toluene layer was washed once with water, dried with potash and boiled down under vacuum. 17.0 g. of 4-azaphenothiazine of a melting point of 101–103° C. were obtained. An analysis of such product indicated that it consisted of 99% of 4-azaphenothiazine and 1% of 2-phenyl amino pyridine. Upon recrystallization from ethanol its melting point rose to 114° C. and its purity to 99.8%.

I claim:
1. A method for the recovery of the azaphenothiazine contained in a mixture of an azaphenothiazine selected from the group consisting of an azaphenothiazine of the formula

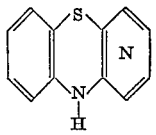

and an azaphenothiazine of said formula carrying at least one substituent on at least one of the benzene and pyridine nuclei selected from the group consisting of halogen, hydroxy, lower alkyl, trihalo lower alkyl and lower alkoxy and the corresponding secondary phenyl pyridyl amine selected from the group consisting of a phenyl pyridyl amine of the formula

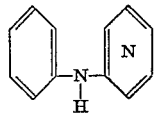

and a phenyl pyridyl amine of said formula carrying at least one substituent on at least one of the benzene and pyridine nuclei selected from the group consisting of halogen, hydroxy, lower alkyl, trihalo lower alkyl and lower alkoxy obtained in the production of said azaphenothiazine from said phenyl pyridyl amine which comprises dissolving said mixture in an inert substantially water immiscible solvent, for said mixture adding a quantity of acid to said solution which is about equivalent to the quantity of phenyl pyridyl amine contained therein to form the acid addition salt of the phenyl pyridyl amine, providing a sufficient quantity of water in contact with said reaction mixture to dissolve the acid addition salt of the phenyl pyridyl amine produced, separating the resulting aqueous phase from the organic phase and recovering the azaphenothiazine retained in the organic phase.

2. The process of claim 1 in which the acid is added to said solution in the form of an 0.5 to 10 N aqueous solution, the quantity of acid provided thereby being such as to be equivalent to the phenyl pyridyl amine present up to 10% by weight in excess of said equivalent amount.

3. The process of claim 1 in which said mixture to be separated is a mixture of 4-azaphenothiazine and 2-phenyl amino pyridine.

4. The process of claim 3 in which said acid is an aqueous 0.5 to 10 N strong mineral acid.

5. The process of claim 3 in which said acid is an aqueous 0.5 to 10 N acid selected from the group consisting of hydrochloric acid, sulfuric acid, phosphoric acid, nitric acid, formic acid, acetic acid, monochloroacetic acid, dichloroacetic acid and p-toluene sulfonic acid.

References Cited
UNITED STATES PATENTS
2,974,139   3/1961   Schuler et al. _____ 260—243

HENRY R. JILES, *Primary Examiner.*

H. MOATZ, *Assistant Examiner.*